(12) United States Patent
Oshins et al.

(10) Patent No.: US 6,748,461 B2
(45) Date of Patent: Jun. 8, 2004

(54) SYSTEM AND METHOD FOR ACCESSING A CMOS DEVICE IN A CONFIGURATION AND POWER MANAGEMENT SYSTEM

(75) Inventors: Jacob Oshins, Seattle, WA (US); Stephane G. Plante, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 335 days.

(21) Appl. No.: 09/808,746

(22) Filed: Mar. 15, 2001

(65) Prior Publication Data

US 2002/0169899 A1 Nov. 14, 2002

(51) Int. Cl.[7] .................................................. G06F 3/00
(52) U.S. Cl. ............................ 710/8; 710/10; 710/104; 713/100; 712/225
(58) Field of Search ............................ 710/8, 9, 11, 13, 710/104, 36, 38; 713/100, 350, 340, 1, 15; 712/32, 225

(56) References Cited

U.S. PATENT DOCUMENTS

| | | | | |
|---|---|---|---|---|
| 4,959,860 A | * | 9/1990 | Watters et al. | 380/4 |
| 5,138,706 A | * | 8/1992 | Melo et al. | 395/500 |
| 5,805,923 A | * | 9/1998 | Shay | 710/8 |
| 6,148,387 A | * | 11/2000 | Galasso et al. | 711/203 |
| 6,167,511 A | * | 12/2000 | Lewis | 713/2 |
| 6,185,677 B1 | * | 2/2001 | Nijhawan | 713/2 |
| 6,253,319 B1 | * | 6/2001 | Tran et al. | 713/1 |
| 6,542,995 B2 | * | 4/2003 | Heinrich et al. | 713/202 |

OTHER PUBLICATIONS

Intel Microsoft Toshiba, Advanced Configuration and Power Interface Specification, Feb. 2, 1999, Revision 1.0b; the entire document may have relevance. Pertinent pages include pp. 2, 18–20, 25, 70–72, 360, 376–377.

* cited by examiner

Primary Examiner—Fritz Fleming
Assistant Examiner—Rijue Mai
(74) Attorney, Agent, or Firm—Merchant & Gould P.C.

(57) ABSTRACT

Described is a system and method by which data accesses to information related to a CMOS device are synchronized. A special "operation region" is provided through which the information is accessed. More specifically, a "CMOS Operation Region" is enabled through which CMOS information is read or written. When an AML interpreter performs a read or write instruction to the CMOS operation region, the ACPI system passes that instruction to a process for handling that operation region, in this example the system kernel. The process may include mechanisms that synchronize accesses to the Operation Region so that a load or store operation is fully completed prior to allowing a subsequent load or store operation. In this way, the information associated with the CMOS that is loaded in memory is not corrupted by asynchronous accesses.

21 Claims, 5 Drawing Sheets

SYSTEM AND METHOD FOR ACCESSING A CMOS DEVICE IN A CONFIGURATION AND POWER MANAGEMENT SYSTEM

FIELD OF THE INVENTION

The present invention relates to computer systems, and more particularly, to a configuration management subsystem of a computer system.

BACKGROUND OF THE INVENTION

ACPI (Advanced Configuration and Power Interface) is an open industry specification that defines a flexible and extensible interface for computer system configuration and power management. The interface enables and supports power management through improved hardware and operating system coordination. ACPI allows the operating system to control the power states of many ACPI-compliant hardware components, and/or to pass information to and from some hardware components, such as the temperature of a thermal sensor or the power remaining in a battery.

During the boot process, an ACPI namespace is populated with software objects that are read from ACPI tables that are stored in an ACPI BIOS. Each hardware device in the machine has associated with it one or more of the objects in the ACPI namespace. As part of reading the ACPI tables and populating the ACPI namespace, often information is read from a CMOS device and placed temporarily in memory. For the purpose of the following discussion, the term "CMOS device" means that portion of a computer having battery-backed storage, more specifically referred to as the PC-compatible Real Time Clock/CMOS Device. The typical CMOS device is the only place that computer firmware can store data that will not be lost even if the machine loses power. The typical CMOS device contains between 64 and 512 bytes of such non-volatile memory.

Because existing firmware systems do not provide safeguards on access to the CMOS devices, the information in memory may be easily corrupted if data is changed in the CMOS device while the data is also being read by another process. More specifically, the CMOS device is accessed through an indexed pair type mechanism. The CMOS device defines two separate and distinct registers. The first register (known as the index register) is used to define which offset in CMOS is desired. The second register (known as the data register) is used to access the data at the specified offset. To access CMOS properly, the index register must first be programmed with the desired offset, then the data is read from or written to the data register. A CMOS interleaved-access problem occurs if two pieces of code try to access the index and data register simultaneously. The following brief example best illustrates the problem:

1. Thread #1 attempts to read the contents of the CMOS device at Offset 0×13, so it writes 0×13 to the index register. However, before it has a chance to read from the data register, Thread #1 is preempted.
2. Thread #2 attempts to write 0×F3 to CMOS at Offset 0×20, so it writes 0×20 to the index register. However, before it has a chance to write to the data register, Thread #2 is preempted.
3. Thread #1 gets scheduled and runs again. It resumes from its last point of execution and reads the data from the data register. However, because the index register is now 0×20, the data is not the intended data, so it tries again and writes 0×13 to the index register. However, before it has a chance to read from the data register, Thread #1 is again preempted.
4. Thread #2 gets scheduled and runs again. It writes 0×F3 to the Data register, but since the index register is now 0×13, it wrote 0×F3 to the wrong offset.
5. Thread #1 runs again and reads from the data register, and gets the 0×F3.

As can be seen, interleaving accesses to the CMOS device can result in corruption. The simultaneous accesses to the CMOS device may be by two pieces of code in firmware, or may be between the firmware and the computer's operating system. Existing firmware systems do not provide safeguards against such corruption. Thus, a need exists for a system and method for providing reliable access to a CMOS device by components interacting with a configuration management system.

SUMMARY OF THE INVENTION

Briefly stated, the present invention provides a system and method by which data accesses to information related to a CMOS device are synchronized by creating a special operation region through which the information is accessed. The invention defines an operation region of a new type from those available. More specifically, a "CMOS Operation Region" is enabled through which the CMOS information is read or written. The memory within the CMOS device is typically composed of several disjoint 64-byte chunks, called "banks." The CMOS Operation Region presents an "address space" from 0 to N where N is the highest-numbered byte. The CMOS Operation Region abstracts the banks into the flat address space. AML that reads from or writes to a specific byte just refers to it by its offset in the address space.

When the AML interpreter performs a read or write instruction to the new operation region, the ACPI system passes that instruction to a process for handling that operation region, in this example the system kernel. The process may include mechanisms that synchronize accesses to the Operation Region so that a load or store operation is fully completed prior to allowing a subsequent load or store operation. In this way, the information associated with the CMOS device may be accessed in one atomic operation (i.e., not preemptable).

Other advantages will become apparent from the following detailed description when taken in conjunction with the drawings, in which:

DETAILED DESCRIPTION OF EMBODIMENTS OF THE INVENTION

The present invention may be implemented in a configuration and power management system, such as ACPI, to prevent interleaved access to a CMOS device within a computer system. In the implementation described here, an example ACPI system provides access to the CMOS device through the use of a new "operation region" type rather than directly to the CMOS device itself. Accesses to the CMOS device via the new operation region type are passed from an ACPI driver in control of the ACPI system to a kernel that includes mechanisms to synchronize access to the CMOS device. In this way, access to the CMOS device through the ACPI system may be synchronized by being passed to the kernel rather than being handled natively by the ACPI system. This mechanism also overcomes problems associated with accesses to the CMOS device that may occur simultaneously through the kernel and the ACPI system without resorting to the added complexities of coordinating locking mechanisms between the operating system and the firmware system. Instead, access to the CMOS device is channeled through a single mechanism, the operating system in the preferred embodiment. In describing this implementation of the invention, the several components implementing the invention will be discussed first, followed by a process for implementing the invention, described through the use of those several components.

Exemplary Operating Environment

Figure 1:
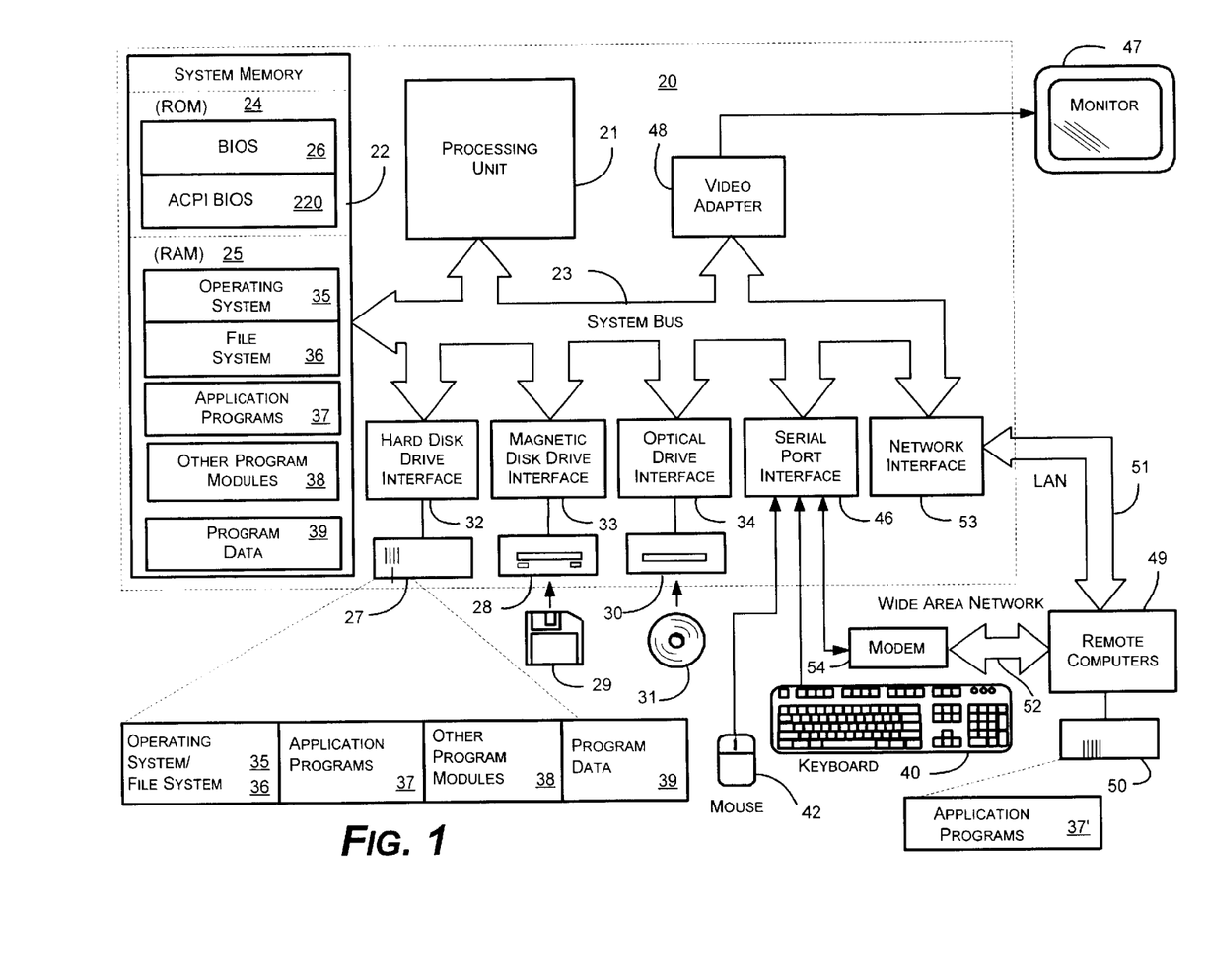
FIG. 1 is a functional block diagram representing a computer system into which the present invention may be incorporated.

FIG. 1 and the following discussion are intended to provide a brief general description of a suitable computing environment in which the invention may be implemented. Although not required, the invention will be described in the general context of computer-executable instructions, such as program modules, being executed by a computer system. Generally, program modules include routines, programs, objects, components, data structures and the like that perform particular tasks or implement particular abstract data types.

Moreover, those skilled in the art will appreciate that the invention may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional computer system 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the computer system 20, such as during start-up, is stored in ROM 24. An ACPI BIOS 220 is additionally stored in ROM 24, and may be stored as a portion of the BIOS 26. The ACPI BIOS 220 is described more fully below.

The computer system 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the computer system 20. Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35 (preferably Windows® 2000). The computer 20 includes a file system 36 associated with or included within the operating system 35, such as the Windows NT® File System (NTFS), one or more application programs 37, other program modules 38 and program data 39. A user may enter commands and information into the computer system 20 through input devices such as a keyboard 40 and pointing device 42. Other input devices (not shown) may include a microphone, joystick, game pad, satellite dish, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, computer systems typically include other peripheral output devices (not shown), such as speakers and printers.

The computer system 20 may operate in a networked environment using logical connections to one or more remote computers 49. The remote computer (or computers) 49 may be another computer system, a server, a router, a network PC, a peer device or other common network node, and typically includes many or all of the elements described above relative to the computer system 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, Intranets and the Internet.

When used in a LAN networking environment, the computer system 20 is connected to the local network 51 through a network interface or adapter 53. When used in a WAN networking environment, the computer system 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the computer system 20, or portions thereof, may be stored in the remote memory storage device. It will be appreciated that the network connections shown are exemplary and other means of establishing a communications link between the computers may be used.

Illustrative Configuration Management System

Figure 2:
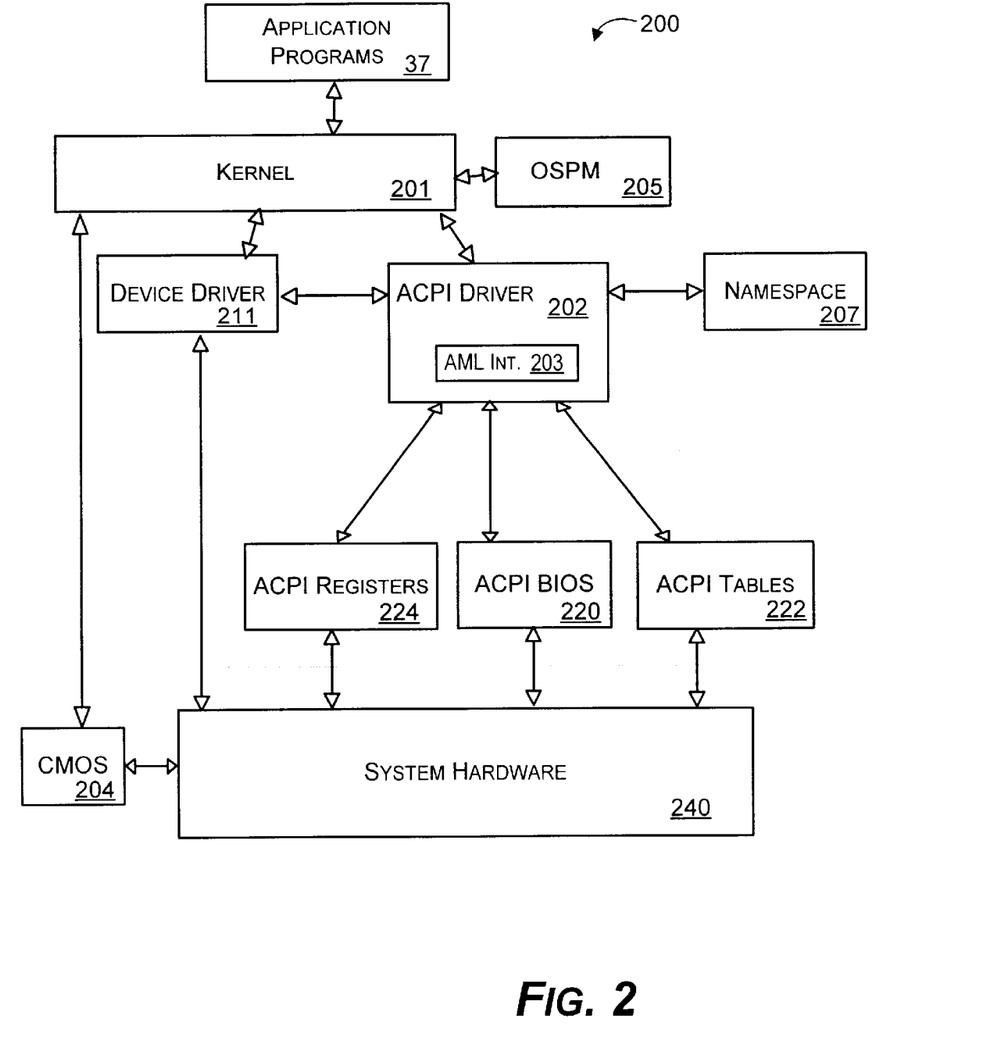
FIG. 2 is a functional block diagram of an illustrative configuration management system constructed in accordance with one implementation of the present invention.

FIG. 2 is a functional block diagram of an ACPI system 200 as implemented in the computer system 20 of FIG. 1. The ACPI system 200 illustrated is one example of a configuration management system that may benefit from the present invention. The present invention may be described herein with reference to the ACPI configuration management system, however, there is no intention to limit the present invention to ACPI. Rather, the present invention is intended to operate with and provide benefits with any operating system, architecture, and/or configuration management system.

As shown, the application programs 37 may interface with a kernel 201, which is a part of the operating system 35. The kernel 201 can be generally considered as one or more software modules that are responsible for performing many operating system functions. One such function is passing information between the application programs 37 and the lower level components of the ACPI system 200, such as the ACPI driver 202 (described below), various device drivers (e.g., device driver 211), and the CMOS 204. In this embodiment, the kernel 201 already includes mechanisms and structures that allow synchronous access to the CMOS 204, thus preventing corruptions of the type explained above (e.g., interleaved CMOS accesses). For that reason, accesses to the CMOS 204 that go through the kernel 201 do not suffer from the same problems identified above. However, devices may possibly access the CMOS 204 through the ACPI system 200 without making use of the kernel 201. For instance, in the absence of the present invention, when populating an ACPI namespace 207, two device drivers could have written to or read from the CMOS 204 through the ACPI driver 202 in an asynchronous manner, thereby introducing the possibility of corruptions. Likewise, access to the CMOS 204 by the ACPI driver 202 could conflict with a simultaneous access by the kernel 201.

The kernel 201 interfaces with Operating System Power Management (OSPM) system code 205. The OSPM system code 205 comprises one or more software modules that may be a part of the operating system 35 and that may be used to modify the behavior of certain components of the computer system 20, typically to conserve power in accordance with pre-configured power conservation settings. As is generally known, the various device drivers 211 interface with and generally control the hardware installed in the computer system 20.

The ACPI driver 202 is, generally speaking, a module that controls the functioning of much of the ACPI system 200. The ACPI driver 202 may be supplied as part of the operating system 35 or as a separate component. In the described system, the ACPI driver 202 is loaded during system start-up at the base of a tree of devices, where it acts as an interface between the operating system 35 and the ACPI BIOS 220 (described below). The responsibilities of the ACPI driver 202 include support for plug and play (PnP) and power management. The ACPI driver 202 is responsible for initiating and maintaining the ACPI system 200, such as by populating an ACPI namespace 207 (illustrated in detail in FIG. 3 and described below) at system startup, loading and unloading description blocks from the ACPI namespace at run time, handling certain generic events triggered by ACPI hardware, and handing off other events to modules registered to handle those events.

The ACPI driver 202 makes use of several components when performing the functions of the ACPI system 200. One component is the ACPI BIOS 220, which refers to the portion of system firmware that is compatible with the ACPI specification. Generally stated, the ACPI BIOS 220 is part of the code that boots the machine (similar to the BIOS 26 present in most conventional computer systems) and implements interfaces for power and configuration operations, such as sleep, wake, and some restart operations. The ACPI BIOS 220 contains definition blocks used to construct ACPI Tables 222, as is described in greater detail below. Note that although the CMOS 204 and the ACPI BIOS 220 are illustrated as separate components in FIG. 2, they may be implemented within a single component (e.g., a single BIOS component) in the computer system 20.

The ACPI Tables 222 are composed of as few as one, but most likely many, definition blocks that contain data and/or control methods. Each set of data and/or control methods defines and provides access to a respective hardware device. The definition blocks are written in an interpreted language called ACPI Machine Language (AML), the interpretation of which is performed by an AML interpreter 203 within the ACPI driver 202. One such definition block, a Differentiated Definition Block (DDB), describes the base computer system. Other definition blocks may be provided to describe additional ACPI devices. During the boot process and the process of populating the ACPI namespace 300, the ACPI tables 222 may cause code to be executed that either reads from or writes to the CMOS 204 as part of constructing objects within the ACPI namespace 207.

As mentioned, the definition blocks may contain control methods. A "control method" is a software module that defines how the ACPI system 200 performs a hardware-related task. For example, the ACPI system 200 may invoke a control method to read the temperature of a thermal zone. Control methods are written in AML, are stored in the definition blocks within the ACPI BIOS 220, and are loaded into the ACPI namespace 300 (FIG. 3), typically at system boot up. Once in the ACPI namespace 300, the control methods may be invoked by other components in the ACPI system 200, such as device drivers 211 or the like, and are then interpreted and executed by a virtual machine in the ACPI driver 202. The use and structure of the ACPI namespace 207, and the objects within, are described in greater detail below with respect to FIG. 3.

The ACPI registers 224 are a constrained part of the hardware interface, described (at least in location) by the ACPI Tables 222. The ACPI registers 224 allow the hardware devices to surface events to the ACPI driver 202 by setting bits associated with the particular hardware devices, similar in function to a system interrupt. Refer to the publicly-available ACPI Specification Version 2.0 for a more detailed discussion of the ACPI tables 222, the ACPI registers 224, definition blocks, and the functions performed by the ACPI driver 202.

Figure 3:
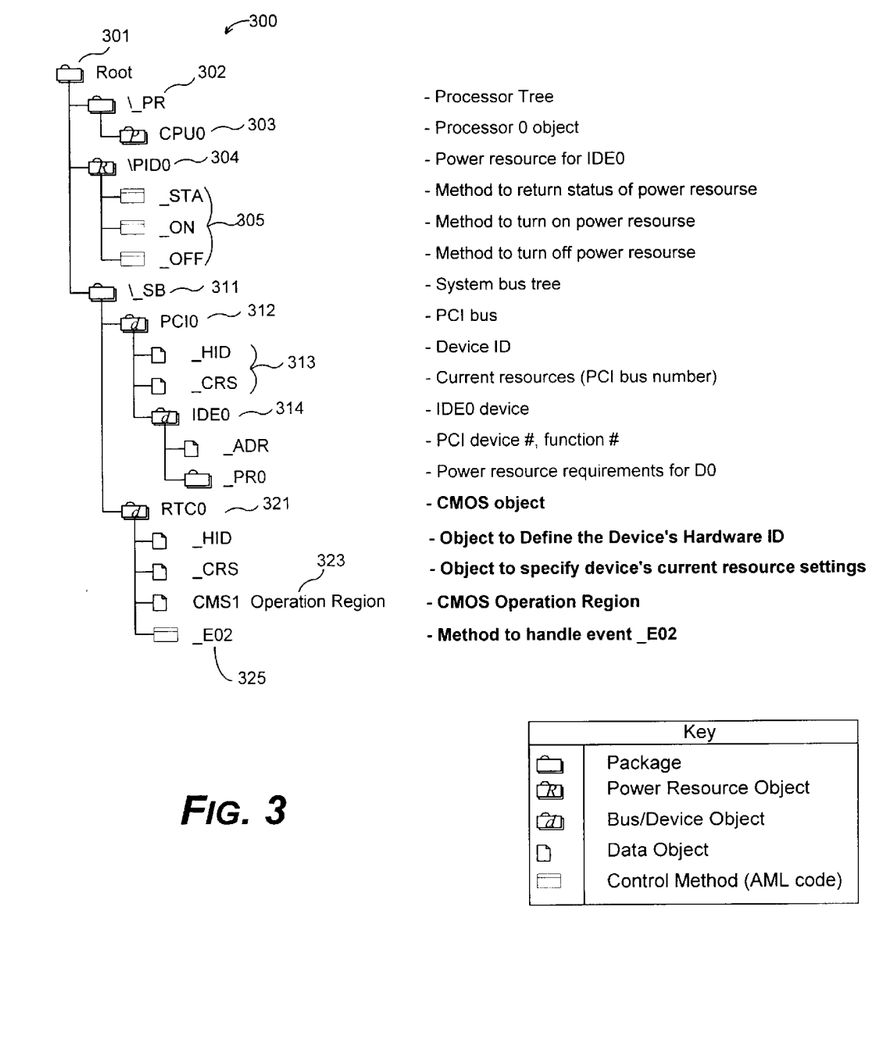
FIG. 3 is a graphical representation of a namespace employed by the illustrative configuration management system illustrated in FIG. 2 and embodying one implementation of the present invention.

FIG. 3 is a graphical representation of one possible ACPI namespace 300 which essentially represents a working version of the ACPI tables 222. The ACPI Namespace 300 is a hierarchical tree structure in protected memory that contains named objects which describe the ACPI-aware devices installed in the computer system 20. The objects may be data objects, control method objects, bus/device objects, or the like. The information in the ACPI namespace 300 comes from the Differentiated System Description Table (DSDT) stored in the ACPI BIOS 220 and may also come from one or more Secondary System Description Tables. The DSDT and any SSDTs contain one or more definition blocks that describe the hardware. As mentioned, at boot time, the operating system 35 (via the ACPI driver 202) reads the ACPI tables 222 from the ACPI BIOS 220 and loads the definition blocks from the ACPI tables 222 to construct the ACPI namespace 300. The ACPI driver 202 may dynamically change the contents of the ACPI namespace 300 at run time by loading and/or unloading additional definition blocks from the ACPI Tables 222.

Shown in FIG. 3 is one illustrative ACPI namespace 300, containing a namespace root 301, several illustrative branches under the root, and several other objects of various types. For example, under the root is a system bus tree \_SB 311. The \_SB namespace includes namespace objects that define ACPI-compliant components attached to the system bus. One example of such a namespace object is the PCI bus namespace object 312. Each namespace object may have other objects as children thereof, such as data objects, control methods, or other namespace objects (e.g., PCI0 namespace object). Each namespace object may contain other objects, such as data objects 313, control methods 305, or other namespace objects (e.g., IDE0 namespace object 314).

Several control methods may be loaded in the ACPI namespace 300 in connection with various objects. For example, control methods related to the status and maintenance of a particular power resource object may be loaded within the scope of the power resource object, such as control methods 305 under the power resource object \PID0 304.

Operation Regions

Before proceeding, a short summary of how devices within the ACPI system 200 interact with the hardware is appropriate. ACPI control methods are written in an interpreted language (named ACPI Machine Language or "AML") for a virtual machine supported by an ACPI-compatible operating system and in which ACPI control methods are executed. AML is similar to a "Load/Store" language in that statements that cause I/O operations to the hardware either read (load) or write (store), but not both in the same statement. Read or write operations are performed with respect to an "Operation Region." Operation regions are a type of data object associated with a namespace object that contains hardware registers for use by control methods. via an operation region, read or write operations are performed from or to the hardware described by the namespace object.

To read or write to hardware, the AML interpreter 203 makes either the target or source (corresponding to a write or read, respectively) of a command refer to a "field unit" of an operation region. Field units define offsets within the operation region. For example, a definition block for a particular device may define a namespace object having an operation region within a bus or system I/O space. A read or write to the namespace object is interpreted by the ACPI driver 202 as an access of the defined bus or system I/O space. To read from or write to hardware represented by the namespace object, the ACPI driver 202 issues a read or a write command identifying an operation region and a field unit within the operation region.

The ACPI Specification has traditionally defined five operation region types: type 0 (System Memory), type 1 (System I/O), type 2 (PCI_Config), type 3 (Embedded Controller), and type 4 (SMBus). The ACPI driver 202 is configured to handle I/O accesses to those predefined operation regions. The ACPI Specification also provides for operation regions other than those defined above. In particular, operation regions having a type number between 0x80 and 0xFF are available for use by ACPI-compliant hardware. This implementation of the invention introduces a new operation region (e.g., "CMOS Operation Region") in addition to those described above. It is this new CMOS operation region that provides the mechanism to synchronize access to the CMOS device.

Synchronized CMOS Device Access

Returning to FIG. 3, in this implementation, the ACPI tables 222 include a definition block that defines a special namespace object (a "CMOS object") 321 to be used for access to the CMOS device. The CMOS object includes a data object 323 that declares a CMOS operation through which the CMOS hardware may be accessed. When the ACPI tables 222 are loaded (either at boot time or later), the CMOS object is created in the ACPI namespace 300 and includes the data object defining the new CMOS operation region. Associated control methods, such as control method 325, may also be included with the CMOS object. The following sample ACPI Source language (ASL) code may be used to define the CMOS object 321 illustrated in FIG. 3, including the operation region 323:

```
Device (RTC0) {
    Name(_HID, EISAID("PNP0B00"))
    Name(_CRS, ResourceTemplate( ) {
        IO(Decode16, 0x70, 0x70, 0x1, 0x2)
    }
    OperationRegion(CMS1, CMOS, 0, 0x40)
    Field(CMS1, ByteAcc, NoLock, Preserve) {
        AccessAs(ByteAcc, 0),
        CM00,       8,
        ,256,
        CM01,       8,
        CM02,       16,
        , 216,
        CM03,       8
    }
}
```

Referring to FIG. 3, the sample code illustrated above defines a CMOS object named "RTC0." The CMOS object RTC0 321 declares the CMOS operation region 323 with the statement "OperationRegion(CMS1, CMOS, 0, 0x40)," which is accessible as defined in the "field" statement. Of course, other ASL code will be equally useful to create other CMOS objects accessible via other CMOS operation regions, as will be apparent to those skilled in the art. With the described construct, the CMOS hardware associated with the CMOS object 321 includes a hardware ID (the _HID object) of PNP0B00, which may be associated with a particular hardware manufacturer's CMOS device. Other hardware IDs may be used to distinguish between devices provided by various manufacturers, including the algorithms used to access them.

Data accesses to the CMOS device may be performed through the use of the CMOS object 321 and the CMOS operation region 323. When a command is issued by a device driver or other process that invokes a read or write to the new operation region (e.g., a read of a CMOS register containing the system clock time), the ACPI driver 202 passes that command to the provider registered to handle that operation region, which is the system kernel 201 for CMOS operation regions in this implementation. In this way, any access to the CMOS device through the ACPI system 200 may be passed through to the system kernel 201, which (as mentioned above) includes mechanisms for synchronizing access to the CMOS. It will be apparent that another component may be substituted for the kernel 201 so long as the substituted component includes mechanisms to ensure that simultaneous accesses to the CMOS device are handled in such a way as to prevent corruption.

Operation of the Configuration Management System

Figure 4:
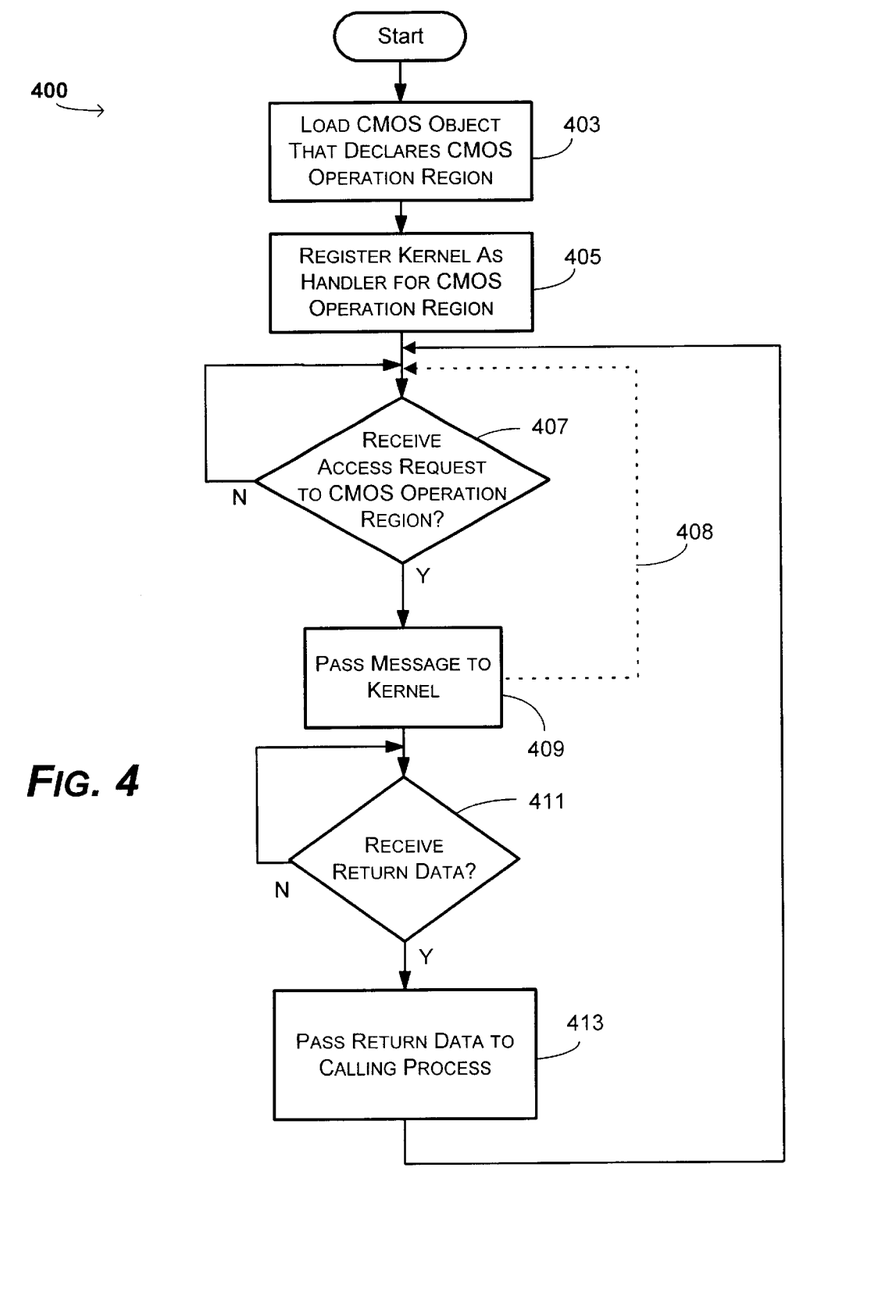
FIG. 4 is a logical flow diagram generally illustrating a process for populating a namespace with a component through which a CMOS device may be synchronously accessed, in accordance with one embodiment of the present invention.
Figure 5:
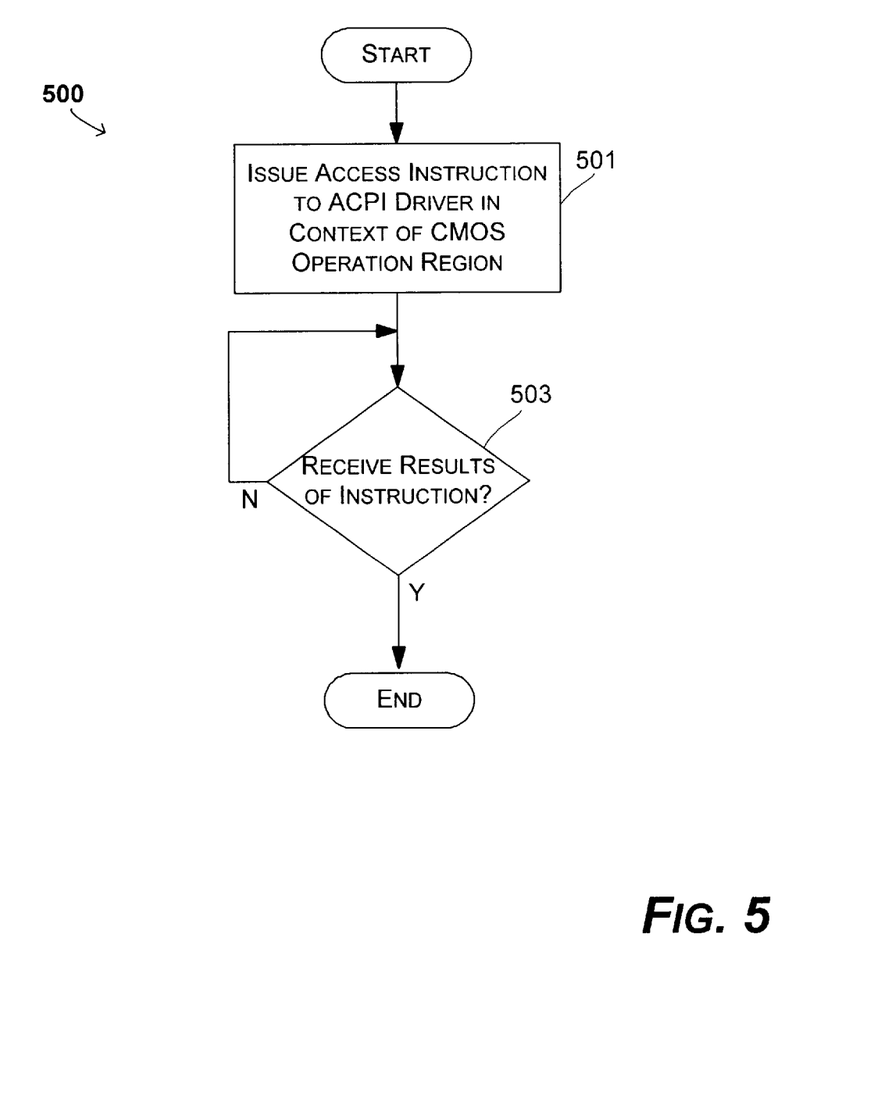
FIG. 5 is a logical flow diagram generally illustrating a process through which a CMOS device may be accessed through the illustrative configuration management system of FIG. 2, in accordance with one implementation of the invention.

FIGS. 4 and 5 are logical flow diagrams summarizing processes performed by components of the above-described illustrative configuration management system implementing the present invention. FIG. 4 is a logical flow diagram generally illustrating a process 400 performed by the ACPI driver 202 of the ACPI system 200 to provide access to a CMOS device 204. The process begins at block 403, where the ACPI driver 202 loads into memory a namespace object that defines an operation region for passing information to and from a CMOS device. For example, in the system illustrated in FIGS. 2–3, a CMOS operation region 323 is defined as a data object to be used when reading from or writing to the CMOS device defined by the namespace object RTC0 321.

At block 405, the ACPI driver 202 registers a provider to handle access requests to the CMOS operation region defined at block 403. The ACPI driver 202 may internally maintain lists or tables that describe how each operation region is handled, or it may resort to an external registration source. In this example, the ACPI driver 202 essentially registers with itself to handle the CMOS operation region type. The ACPI driver 202 then passes any CMOS operation accesses to the kernel 211 to be handled. Of course, another component may alternatively be registered as a provider for the CMOS operation region.

At decision block 407, the ACPI driver 202 idles until it ultimately receives a message or request to access the CMOS operation region defined at block 403. For example, a control method (or other firmware code) may request that the ACPI system 200 retrieve some value (such as the current system time) from the CMOS device 204 by issuing a read instruction to the CMOS operation region 323. Likewise, the control method may desire to write information to the CMOS device. In those cases, the ACPI driver 202 passes the message or request to the provider registered to handle the CMOS operation region at block 409, the kernel 201 in this instance.

At decision block 411, the ACPI driver 202 awaits the return of any data that may have been requested by the message. It should be noted that return data might not be necessary, such as in the case of a write of data to the CMOS device 204. If return data is not appropriate, the process 400 may return to await another access request as illustrated by the dashed line 408 from block 409 to the decision block 407. For the cases where return data is appropriate, the ACPI driver 202 awaits, at decision block 411, for the return data. When the ACPI driver 202 receives the return data, the process 400 proceeds to block 413. As will be appreciated, the process 400 may terminate naturally through timeout mechanisms (not shown) while waiting for data to return.

At block 413, the ACPI driver 202 passes the data received at decision block 411 to the control method that requested the data. For example, the kernel 201 may return data to the ACPI driver 202 that is retrieved from the CMOS device 204. The ACPI driver 202 then passes the return data to the requesting control method, and the process 400 returns to block 407 to await further requests until otherwise terminated, such as by the expiration of a timer or interrupted by another process.

FIG. 5 is a logical flow diagram generally illustrating a process 500 performed a component within the computer system 20, such as a control method or other firmware code, to access the CMOS device 204 through the ACPI system 200. The process 500 begins at block 501, where the control method issues an instruction to the ACPI driver 202 to access the CMOS device 204. In accordance with the system described above, the control method issues a command to the ACPI driver 202 to perform a read or write operation identifying a field unit within the CMOS operation region 323 as either the source or target (respectively) of the command. In this way, the ACPI driver 202 may act on the command (generally as described above in the context of FIG. 4) by passing the instruction to the kernel 211 or other process configured to handle access to the CMOS device 204 in a synchronous manner. In this way, interleaved access to the CMOS device 204 by the firmware and the operating system are avoided.

At decision block 503, the device driver 211 may await results of the instruction. For example, if the instruction was a request to read information from the CMOS device 204, the results may be that information. If the instruction was a request to store information to the CMOS device 204, the result may be a success or fail message. When the results are returned (or a timeout occurs), the process 500 terminates.

As can be seen from the foregoing detailed description, the invention provides a system and method for allowing synchronized access to a CMOS device through a configuration management system. While the invention is susceptible to various modifications and alternative constructions, certain illustrated embodiments thereof are shown in the drawings and have been described above in detail. It should be understood that the invention is not limited to the specific forms disclosed, but rather, the invention covers all modifications, alternatives, and equivalents falling within the spirit and scope of the claims.

What is claimed is:

1. A computer-readable medium having computer-executable instructions, comprising:
   loading a component in a configuration management system, the component defining an I/O space for providing access to a CMOS device;
   registering a provider to handle instructions issued to the defined I/O space;
   receiving an instruction from a requesting component of the configuration management system to access the CMOS device through the defined I/O space; and
   passing the instruction to the provider registered to handle the instruction.

2. The computer-readable medium of claim 1, further comprising:
   receiving data returned from the provider; and
   passing the returned data to the requesting component.

3. The computer-readable medium of claim 2, wherein the data returned from the provider comprises information associated with the CMOS device.

4. The computer-readable medium of claim 1, wherein the defined I/O space comprises an operation region of the configuration management system.

5. The computer-readable medium of claim 1, wherein the component is loaded in an information store associated with the configuration management system.

6. The computer-readable medium of claim 5, wherein the information store comprises a namespace.

7. The computer-readable medium of claim 1, wherein the defined I/O space further comprises a hardware identifier defining information associated with the CMOS device.

8. The computer-readable medium of claim 7, wherein the information associated with the CMOS device includes a version of the CMOS device.

9. The computer-readable medium of claim 7, wherein the information associated with the CMOS device identifies a manufacturer of the CMOS device.

10. A computer-readable medium having computer-executable components, comprising:
    a definition block including a CMOS data object that defines an I/O space for accessing a CMOS device;

a first module configured to populate an information store in a configuration management system with information from the definition block including the data object;

a second module configured to register with the configuration management system to handle an instruction directed to the data object, the second module being further configured to synchronize instructions received from the first module and directed to the CMOS data object.

11. The computer-readable medium of claim 10, wherein the first module is further configured to pass instructions directed at the CMOS data object to the second module registered to handle the instructions.

12. The computer-readable medium of claim 10, wherein the definition block comprises executable instructions for creating the CMOS data object within a namespace of a configuration management system.

13. The computer-readable medium of claim 12, wherein the configuration management system comprises an Advanced Configuration and Power Interface system.

14. The computer-readable medium of claim 12, wherein the CMOS data object is defined as an operation region associated with a CMOS device.

15. The computer-readable medium of claim 12, wherein the definition block further includes executable instructions for creating an identification data object that describes the CMOS device.

16. The computer-readable medium of claim 15, wherein the identification data object distinguishes the CMOS device from other CMOS devices by a characteristic.

17. The computer-readable medium of claim 16, wherein the characteristic is a versions of the CMOS device.

18. The computer-readable medium of claim 16, wherein the characteristic is a manufacturer of CMOS devices.

19. The computer-readable medium of claim 10, wherein the second module includes mechanisms for providing synchronous access to the CMOS device.

20. The computer-readable medium of claim 19, wherein the second module comprises a system kernel associated with an operating system.

21. A computer program embodied in a computer-readable medium, the computer program comprising instructions to:

declare a CMOS operation region, wherein the CMOS operation region is declared with ASL code, and wherein the CMOS operation region defines an I/O space for providing access to a CMOS device;

receive an AML request to access the CMOS operation region, wherein the AML request is received at an ACPI driver; and pass the AML request from the ACPI driver to a system kernel.

* * * * *